US00RE47042E

(19) United States
(12) Reissued Patent
Kelly et al.

(10) Patent Number: US RE47,042 E
(45) Date of Reissued Patent: Sep. 18, 2018

(54) ARTICLE OF HEADWEAR

(71) Applicant: NIKE, Inc., Beaverton, OR (US)

(72) Inventors: Erika R. Kelly, Milwaukie, OR (US); Kraig Nelson, Beaverton, OR (US); Ian S. Saiki, Beaverton, OR (US)

(73) Assignee: NIKE, Inc., Beaverton, OR (US)

(21) Appl. No.: 15/276,460

(22) Filed: Sep. 26, 2016

Related U.S. Patent Documents

Reissue of:
(64) Patent No.: 9,049,897
Issued: Jun. 9, 2015
Appl. No.: 13/896,151
Filed: May 16, 2013

(51) Int. Cl.
*A42B 1/18* (2006.01)
*A42B 1/02* (2006.01)
*A42B 1/06* (2006.01)

(52) U.S. Cl.
CPC ..... *A42B 1/063* (2013.01); *A42B 1/18* (2013.01)

(58) Field of Classification Search
CPC ..... A42B 1/063
USPC ..... 2/195.2, 195.5, 195.6
See application file for complete search history.

(56) References Cited

U.S. PATENT DOCUMENTS 2,630,230 A 3/1953 Parsons
2,931,046 A * 4/1960 Klein ..... 2/195.6
2,934,046 A 4/1960 Donohue
3,357,026 A 12/1967 Wiegandt
5,177,811 A 1/1993 Ulrich
5,481,759 A 1/1996 Rinaldi
5,566,395 A 10/1996 Nebeker
5,630,230 A 5/1997 Fujino et al.
5,845,339 A 12/1998 Ashley et al.
5,887,276 A 3/1999 Lee
6,311,331 B1 11/2001 Park
6,493,880 B1 12/2002 Lo
6,546,563 B2 4/2003 Young
6,721,691 B2 4/2004 Bao et al.
6,721,961 B2 * 4/2004 Park ..... 2/175.5
6,735,782 B2 * 5/2004 Park ..... 2/175.5
6,928,660 B2 8/2005 Park
(Continued)

OTHER PUBLICATIONS

Nike Daybreak Hat—http://store.nike.com/us/en/us/?|shop,pdp,str-inline/cid-1/pid-159854/pgid-159855#?|=shop,pdp,str-inline/cid-1/pid-159854/pgid-159855, accessed on Aug. 16, 2012 and Sep. 14, 2012.

(Continued)

*Primary Examiner* — Matthew C Graham
(74) *Attorney, Agent, or Firm* — Shook, Hardy and Bacon L.L.P.

(57) ABSTRACT

An article of headwear includes a crown and a bill. The bill defines an inner edge that is operably coupled to the crown. The bill projects away from the crown and terminates at an outer edge. The bill includes a stiffener that stiffens the outer edge. The stiffener is spaced from the crown to define a cavity within the bill between the stiffener and the crown. The stiffener has a first longitudinal end that is adjacent the inner edge, a second longitudinal end that is adjacent the inner edge, an intermediate portion that is disposed between the first longitudinal end and the second longitudinal end, a top side, and a bottom side. A cross section of the stiffener is substantially constant in the intermediate portion between the first and second longitudinal ends, and one of the top and bottom sides is flat in cross section.

29 Claims, 3 Drawing Sheets

(56) References Cited

U.S. PATENT DOCUMENTS

| | | | | |
|---|---|---|---|---|
| 6,990,692 | B1 * | 1/2006 | Park | 2/195.6 |
| 7,073,206 | B2 * | 7/2006 | Yan | 2/171 |
| 7,950,068 | B2 * | 5/2011 | Chang | A42B 1/063 2/195.2 |
| 2003/0074716 | A1 | 4/2003 | Park | |
| 2004/0210986 | A1 * | 10/2004 | Yan | A42B 1/062 2/171 |
| 2006/0277951 | A1 | 12/2006 | Herr | |
| 2007/0118969 | A1 | 5/2007 | Kim | |
| 2008/0000013 | A1 | 1/2008 | Talley | |
| 2008/0098502 | A1 | 5/2008 | Tai | |
| 2009/0183300 | A1 | 7/2009 | Cho | |
| 2010/0138980 | A1 | 6/2010 | Duda et al. | |
| 2011/0072555 | A1 | 3/2011 | Asiatico | |
| 2011/0252539 | A1 | 10/2011 | Scott | |

OTHER PUBLICATIONS

Office Action dated Feb. 1, 2017 in European Patent Application No. 14737060.5, 3 pages.
European Extended Search Report dated Mar. 29, 2017 for European Patent Application No. 16002474.1, 8 pages.
Office Action dated Aug. 21, 2017 in European Patent Application No. 14737060.5, 3 pages.
International Search Report and Written Opinion for Application No. PCT/US2014/037440, mailed Sep. 11, 2014.

* cited by examiner

ARTICLE OF HEADWEAR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application of U.S. Pat. No. 9,049,897, issued on Jun. 9, 2015, from U.S. patent application Ser. No. 13/896,151, filed May 16, 2013, each of which is hereby incorporated by reference in its entirety.*

FIELD

The present disclosure relates to an article of headwear and, more particularly, relates to an article of headwear that promotes movement of perspiration from the head of the wearer.

BACKGROUND

This section provides background information related to the present disclosure which is not necessarily prior art.

Baseball hats and other types of headwear can include a crown and a bill that extends therefrom. In a baseball hat, the crown can be bowl-shaped and can be worn so as to cover the top part of the wearer's head, above the ears. The bill can extend forward from the crown and, in some embodiments, the bill can be curved.

The bill can provide shade for the eyes and face of the wearer. The bill can also provide a convenient area of the hat to grasp when taking the hat on and off. Moreover, the bill can enhance the aesthetics of the hat.

SUMMARY

This section provides a general summary of the disclosure, and is not a comprehensive disclosure of its full scope or all of its features.

An article of headwear is disclosed that is configured to be worn on a head of a wearer. The article of headwear includes a crown for covering a portion of the head. Moreover, the headwear includes a bill that defines an inner edge that is operably coupled to the crown. The bill projects away from the crown and terminates at an outer edge. The bill includes a stiffener that stiffens the outer edge. The stiffener is spaced from the crown to define a cavity within the bill between the stiffener and the crown. The stiffener has a first longitudinal end that is adjacent the inner edge, a second longitudinal end that is adjacent the inner edge, an intermediate portion that is disposed between the first longitudinal end and the second longitudinal end, a top side, and a bottom side. A cross section of the stiffener is substantially constant in the intermediate portion between the first and second longitudinal ends. At least one of the top and bottom sides is substantially flat in the cross section of the stiffener.

An article of headwear configured to be worn on a head of a wearer is also disclosed. The headwear includes a crown that is configured for covering a portion of the head. The headwear also includes a bill that defines an inner edge that is operably coupled to the crown. The bill also projects away from the crown and terminates at an outer edge. The bill includes a stiffener that extends along and that stiffens the outer edge. The stiffener is spaced from the crown. The stiffener includes a top surface. The bill also includes a covering layer that encloses the stiffener within the bill. A cavity is defined between the covering layer, the stiffener, and the crown. The bill further includes an insert that is received and enclosed within the cavity. The insert includes an upper surface. The upper surface and the top surface of the stiffener are substantially aligned in a cross section of the bill.

An article of headwear configured to be worn on a head of a wearer is additionally disclosed. The headwear includes a crown that is configured for covering a portion of the head. The headwear also includes a bill that defines an inner edge. The inner edge is operably coupled to the crown. The bill also projects away from the crown and terminates at an outer edge. The bill includes a stiffener that extends along and stiffens the outer edge. The stiffener is spaced from the crown. The stiffener includes a first longitudinal end that is adjacent the inner edge, a second longitudinal end that is adjacent the inner edge, an intermediate portion that is disposed between the first longitudinal end and the second longitudinal end, a top side, and a bottom side. A cross section of the stiffener is substantially constant in the intermediate portion between the first and second longitudinal ends. Both of the top and bottom sides are substantially flat in the cross section of the stiffener. The bill also includes a covering layer with an upper outer surface and a lower outer surface. The covering layer encloses the stiffener within the bill, and a cavity is defined between the covering layer, the stiffener, and the crown. The bill also includes a resiliently compressible insert that is received and enclosed within the cavity. The insert has a thickness that is substantially equal to a thickness of the stiffener. The insert includes an upper surface. The upper surface and the top surface of the stiffener are substantially aligned in a cross section of the bill. The covering layer lies substantially smooth over the insert and the stiffener.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
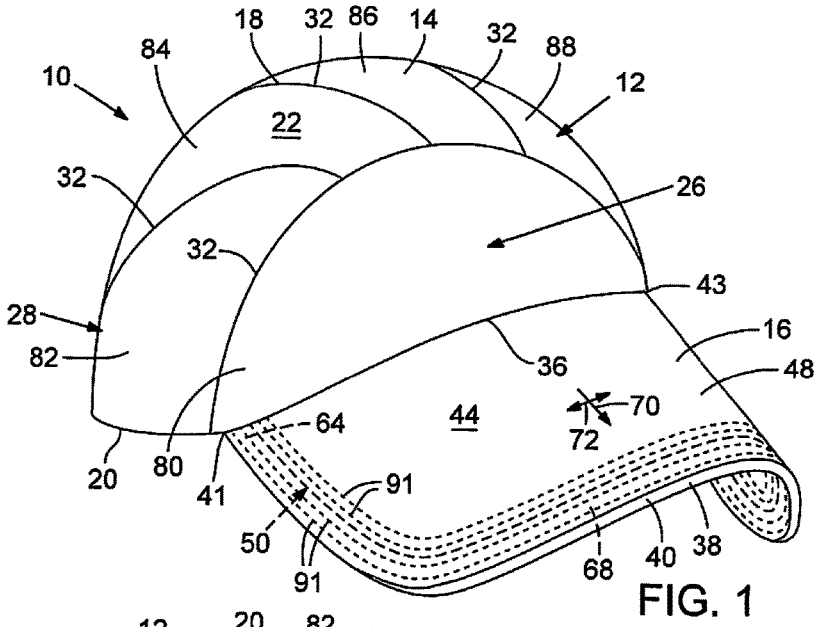
FIG. 1 is an isometric view of an article of headwear according to exemplary embodiments of the present disclosure.
Figure 2:
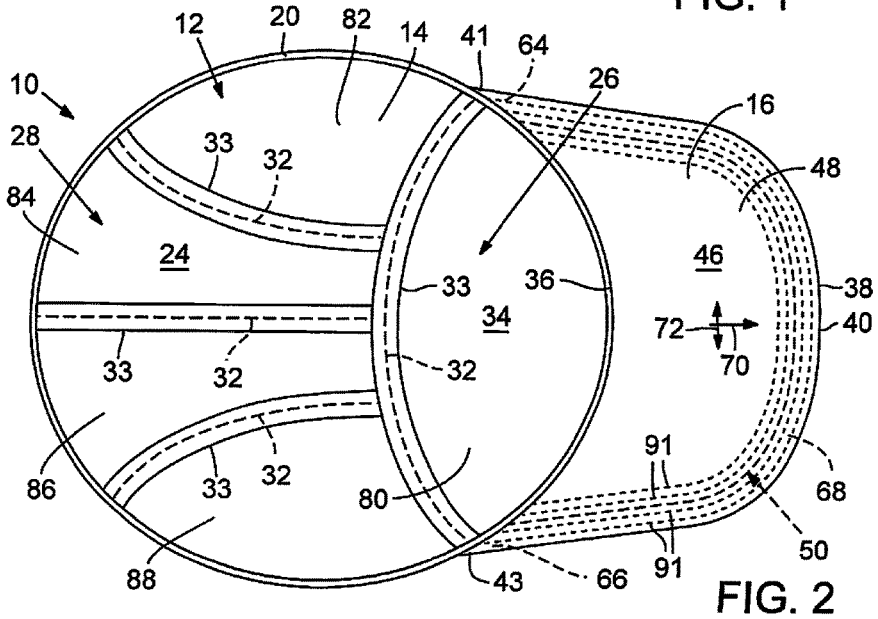
FIG. 2 is a bottom view of the article of headwear of FIG. 1.

Referring initially to FIGS. 1 and 2, an article of headwear 10 is illustrated. In the embodiments shown, the headwear 10 is a hat 12, such as a baseball hat 12 with a crown 14 and a bill 16, each of which will be discussed in detail below. However, it will be appreciated that the headwear 10 could be of a type or style other than a baseball hat 12, such as a visor or other article that is configured to be worn on a head of a wearer. Also, the term "baseball hat" is defined generally herein to connote a type or style of hat rather than the activity in which the wearer engages. Thus, the hat 12 of the present disclosure can be worn for jogging, for working out, and for many other types of activities in addition to or instead of playing baseball.

As mentioned, the hat 12 can be collectively defined by a crown 14 and a bill 16. The crown 14 can be generally bowl-shaped (i.e., hollow and hemispherical). Thus, the crown 14 can define an apex 18 (FIG. 1), can curve hemispherically downward therefrom, and can terminate at a lower rim 20.

The crown 14 can also include an exterior surface 22 and an interior surface 24, which face in opposite directions. When worn on the head of the wearer (not shown), the crown 14 can fit over and cover the wearer's forehead, the lateral and posterior portions of the head above the ears, and the superior portion of the head. The crown 14 can be worn such that the interior surface 24 abuts against the wearer's head and the exterior surface 22 faces away from the wearer's head. Also, the apex 18 of the crown 14 can be disposed at the superior portion of the head while the lower rim 20 can extend continuously about the head above the wearer's ears. In additional embodiments (e.g., where the hat 12 is a visor), the crown 14 can be annular and can encircle the wearer's head.

The crown 14 can further define a forehead covering portion 26, which is configured to lie over at least a portion of the wearer's forehead when the hat 12 is worn conventionally. The crown 14 additionally can define a second portion 28 that extends from the forehead covering portion 26 to cover the lateral, posterior, and superior regions of the wearer's head.

In some embodiments, the crown 14 can include a plurality of individual panels 80, 82, 84, 86, 88. In the embodiments illustrated, there are five panels 80, 82, 84, 86, 88, but the crown 14 can include any number of panels 80, 82, 84, 86, 88 without departing from the scope of the present disclosure. The panels 80, 82, 84, 86, 88 can also have any suitable shape.

The panels 80, 82, 84, 86, 88 can be made out of any suitable material, such as a polyester or other synthetic fabric. In additional embodiments, the panels 80, 82, 84, 86, 88 can be made from a combination of cotton, polyester, and spandex. Moreover, in some embodiments, the panels 80, 82, 84, 86, 88 can be made from DRIFIT materials, developed by Nike, Inc. of Beaverton, Oreg. Thus, the panels 80, 82, 84, 86, 88 can be lightweight, flexible, resiliently stretchable, can readily absorb perspiration from the wearer's head, can distribute the perspiration across the crown 14, and can allow evaporation of the perspiration from the crown 14.

Moreover, the panels 80, 82, 84, 86, 88 can be attached at respective edges along respective seams 32. The seams 32 can be of any suitable type (plain seams, overlap seams, etc.), and the seams 32 can be secured with stitching, adhesives, or any other suitable fashion.

In addition, as shown in FIG. 2, the hat 12 can include one or more tapes 33 that are attached to the interior surface 24 of the crown 14. More specifically, each tape 33 can be substantially aligned with and centered over a respective one of the seams 32 so as to cover the respective seam 32. Thus, the tapes 33 can act as a barrier between the wearer's skin and the seam 32 so that the seam 32 is unlikely to irritate or uncomfortably rub against the wearer's skin.

The tapes 33 can be attached to the crown 14 in any suitable fashion. For instance, in some embodiments, the tapes 33 can be adhesively attached to the crown 14. As such, the tapes 33 can be efficiently attached, and the tape 33 is unlikely to irritate the wearer's skin. Also, the tapes 33 can lie smoothly across the interior surface 24 of the crown 14 such that the crown 14 can fit closely and can conform to the wearer's skin. In additional embodiments, one or more of the tapes 33 can be attached via stitching or other ways without departing from the scope of the present disclosure.

Figure 3:
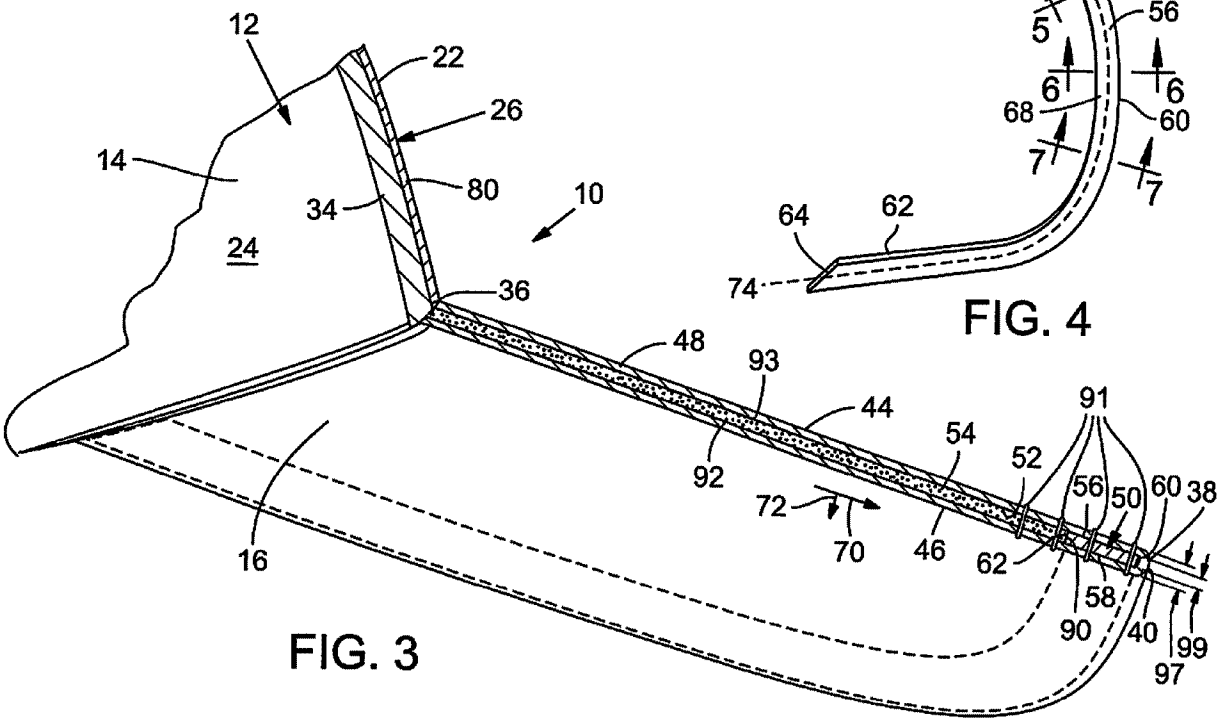
FIG. 3 is a section view of a bill of the headwear taken along line 3-3 of FIG. 2.

Furthermore, as shown in FIGS. 2 and 3, the crown 14 can include a perspiration absorbing panel 34. The panel 34 can be made out of any suitable material, such as a polyester or other synthetic fabric. In additional embodiments, the panel 34 can be made from a combination of cotton, polyester, and spandex. Moreover, in some embodiments, the panel 34 can be made from DRIFIT materials, developed by Nike, Inc. of Beaverton, Oreg. Also, the panel 34 can resiliently stretch in four directions in some embodiments.

The panel 34 can be shaped substantially similar to the panel 80 and can be layered over the interior face thereof. Thus, the panel 34 can be disposed interiorly on the forehead covering portion 26 of the crown 14. Also, the panel 34 can be attached to the panels 80, 82, 84, 86, 88 at the seam 32 that is common to each. Thus, the panel 34 can be detached from the panel 80 at portions that are bordered by this seam 32.

Moreover, the perspiration absorbing panel 34 can have very high wicking capability and absorptivity. As such, perspiration can readily move from the wearer's forehead and through the thickness of the panel 34. While moving through the thickness of the panel 34, the perspiration can readily spread outwardly across the width and length of the panel 34. For instance, using the known AATCC 79 test method, wherein the panel 34 is exposed to a drop of water on one surface, the drop can absorb into, through, and across, the panel 34 virtually instantaneously (on the order of milliseconds). Thus, the panel 34 can be very effective in removing perspiration from the wearer's head and for allowing the perspiration to move to other areas of the hat 12 for evaporation.

The panel 34 can have greater wicking capability and absorptivity than the other panels 80, 82, 84, 86, 88. The panel 34 can absorb perspiration and direct it to other panels 80, 82, 84, 86, 88 of the hat 12 and/or into the bill 16. Thus, the hat 12 can readily move sweat away from the wearer's head and the sweat can readily evaporate from the hat 12. As such, the perspiration is unlikely to drip down into the eyes of the wearer, cause other types of discomfort, etc.

In additional embodiments, the crown 14 can include a sweatband (not specifically shown) that is annular and that extends continuously about the lower rim 20 of the crown 14. The sweatband could be made from the same material as the panel 34 (described above). In further embodiments, the sweatband can extend only partially about the lower rim 20 or other areas of the crown 14. Thus, the sweatband can absorb perspiration from the wearer's head in addition to, or instead of, the absorbing panel 34.

Referring now to FIGS. 1-3, the bill 16 of the hat 12 will be discussed in detail. As shown in FIGS. 1 and 2, the bill 16 can be curved or bowed downward parabolically, similar to the upper half of a duck's bill. However, the bill 16 could have any shape and curvature. Also, the bill 16 could be substantially planar. In some embodiments, the curvature of the bill 16 can be selectively adjusted by the wearer.

The bill 16 can be attached to the crown 14 along an inner edge 36. The bill 16 can also project away and protrude from the crown 14 and can terminate at an outer edge 38. The outer edge 38 can define a forward area 40 and lateral areas 41, 43 on opposite sides of the forward area 40. Specifically, from the forward area 40, the bill 16 can bow downward and curve rearwardly toward the crown 14, and the lateral areas 41, 43 can terminate at the inner edge 36 adjacent the crown 14.

The bill 16 can further define a forward direction 70 generally between the inner edge 36 and the forward area 40 of the outer edge 38. (It is assumed that the wearer typically wears the hat 12 such that the bill 16 projects anteriorly away from the forehead; therefore the term "forward direction" is used. However, it will be appreciated that the direction 70 may point laterally or posteriorly if the wearer wears the hat 12 with the bill to the side or back of the head, respectively.) In some embodiments, the forward direction 70 can extend along an axis that extends linearly from a point equidistant from both lateral areas 41, 43 to an outermost point of the forward area 40 of the bill 16. However, it will be appreciated that the forward direction 70 should be interpreted generally to encompass other outward directions that extend away from the wearer's head when the hat 12 is worn (e.g., normal to the wearer's head and/or face).

The bill 16 can additionally define a transverse direction 72 which is transverse to the forward direction 70. For instance, the transverse direction 72 can be substantially perpendicular to the forward direction 70. Thus, the transverse direction 72 can extend perpendicular to an axis extending linearly from a point equidistant from both lateral areas 41, 43 to an outermost point of the forward area 40 of the bill 16. The transverse direction 72 can curve downward with the curvature of the bill 16. However, it will be appreciated that the transverse direction 72 should be interpreted generally and can be considered to extend generally concentric to the wearer's forehead and face.

The bill 16 can further define an upper surface 44 and a lower surface 46, which are opposite each other. Specifically, the upper surface 44 can face superiorly and the lower surface 46 can face inferiorly when the hat 12 is worn. As shown in FIG. 3, the upper surface 44 and the lower surface 46 can be defined by a covering layer 48 of the bill 16. The covering layer 48 can be a continuous sheet of material that extends from the inner edge 36, folds over itself at the outer edge 38, and that terminates again at the inner edge 36. The covering layer 48 can be attached to the lower rim 20 of the crown 14 in any suitable manner, such as stitching, adhesives, etc.

The covering layer 48 of the bill 16 can be made out of any suitable material, such as a polyester or other synthetic fabric. In additional embodiments, the covering layer 48 can be made from a combination of cotton, polyester, and spandex. Moreover, in some embodiments, the covering layer 48 can be made from DRIFIT materials, developed by Nike, Inc. of Beaverton, Oreg. Thus, like the materials of the crown 14, the covering layer 48 can readily receive and wick perspiration and allow evaporation of the perspiration.

Figure 4:
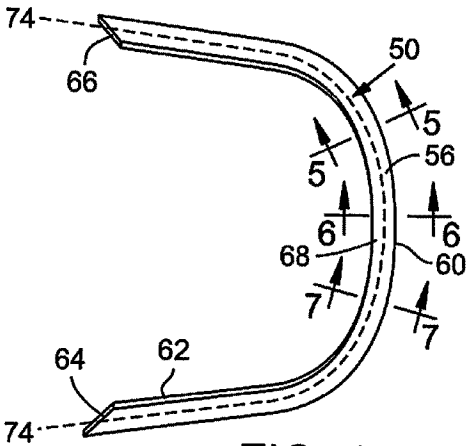
FIG. 4 is a plan view of a stiffener of the headwear of FIG. 1.

The bill 16 can further include a stiffener 50, which is shown independently in FIG. 4, and which is shown assembled in the bill 16 in FIGS. 1-3. Various cross sections of the stiffener 50 (taken substantially perpendicular to the longitudinal axis 74 of the stiffener 50) are shown in FIGS. 3 and 5-7. As will be discussed, the stiffener 50 can extend along and stiffen the outer edge 38 and/or other portions of the bill 16.

The stiffener 50 can be elongate and generally U-shaped (FIG. 4). Also, as shown in FIG. 4, the stiffener 50 can include a first longitudinal end 64, a second longitudinal end 66, and an intermediate portion 68 between the first and second longitudinal ends 64, 66.

The stiffener 50 can include one or more flat sides in the cross sections of FIGS. 3 and 5-7, such as a substantially flat top side 56 and a substantially flat bottom side 58. The stiffener 50 can additionally include a forward edge 60 and a rear edge 62, which extend between the top and bottom sides 56, 58. Thus, the stiffener 50 can have a substantially rectangular cross section.

Figure 5:
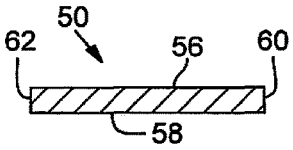
FIG. 5 is a section view of an intermediate portion of the stiffener taken along the line 5-5 of FIG. 4.
Figure 6:
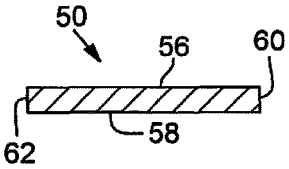
FIG. 6 is a section view of an intermediate portion of the stiffener taken along the line 6-6 of FIG. 4.
Figure 7:
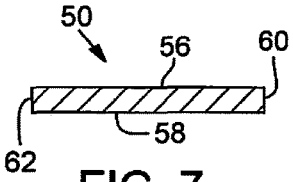
FIG. 7 is a section view of an intermediate portion of the stiffener taken along the line 7-7 of FIG. 4.

In some embodiments, the cross section of the intermediate portion 68 of the stiffener 50 can remain substantially constant along the longitudinal axis 74 (compare FIGS. 5-7). Also, as shown in FIG. 4, the first and second longitudinal ends 64, 66 can each taper downward (e.g., to a point) in a direction moving away from the intermediate portion 68. Specifically, the first and second longitudinal ends 64, 66 can taper to a respective point that is disposed generally on the forward edge 60.

The stiffener 50 can be made out of any suitable material. For instance, the stiffener 50 can be made out of a polymeric material that is resiliently flexible. Also, the stiffener 50 can be molded in some embodiments. In additional embodiments, the stiffener 50 can be made from fibrous materials (e.g., cardboard, etc.).

The stiffener 50 can be embedded and enclosed by the covering layer 48 within the bill 16. For instance, the stiffener 50 can be embedded in the bill 16 such that the stiffener 50 extends continuously along the outer edge 38 of the bill 16, between the lateral areas 41, 43 and across the forward area 40. As such, the first longitudinal end 64 of the stiffener 50 can be disposed at the lateral area 41 of the bill 16, the intermediate portion 68 can extend at least partially along the forward area 40 of the bill 16, and the second longitudinal end 66 can be disposed at the lateral area 43 of the bill 16. Also, the longitudinal axis 74 of the stiffener 50 can extend between the lateral areas 41, 43 and the forward area 40 of the bill 16. Moreover, the top side 56 of the stiffener 50 can face the upper surface 44 of the bill 16, and the bottom side 58 can face the lower surface 46 of the bill 16.

As shown in FIGS. 1, 2, and 3, the stiffener 50 can be spaced away from the inner edge 36 of the bill 16 in the forward direction 70 to define a cavity 52 within the bill 16. The cavity 52 can also be partially defined within the covering layer 48 as shown in the illustrated embodiments of FIG. 3.

In some embodiments, an insert 54 (FIG. 3) can be disposed and enclosed within the bill 16 inside the cavity 52. The insert 54 can be made out of any suitable material, such as foam, or other resiliently flexible and compressible material. The material of the insert 54 can be substantially nonporous such that perspiration within the covering layer 48 is unlikely to move into the insert 54. Also, the insert 54 can be shaped so as to substantially fill the cavity 52. For instance, the insert 54 can extend continuously from the inner edge 36 of the bill 16 to the rear edge 62 of the stiffener 50 and can abut the interior surfaces of the covering layer 48. Stated differently, the covering layer 48 and the stiffener 50 can cooperate to enclose the insert 54 within the cavity 52 of the bill 16.

As shown in FIG. 3, the thickness 99 of the insert 54 can be substantially equal to that of the stiffener 50 (e.g., between approximately 1.5 millimeters and 3 millimeters). Stated differently, an upper surface 93 of the insert 54 can be substantially aligned with the top side 56 of the stiffener 50, and the lower surface 92 of the insert 54 can be substantially aligned with the bottom side 58 of the stiffener 50 (see cross section of FIG. 3). Accordingly, the total thickness 97 of the bill 16 can be substantially constant from the inner edge 36 to the outer edge 38 of the bill 16, and the covering layer 48 can lie substantially smoothly over the stiffener 50 and insert 54 (i.e., without noticeable changes in thickness 97). As such, the bill 16 can be aesthetically appealing and can appear to be similar to a conventional bill.

Figure 11:
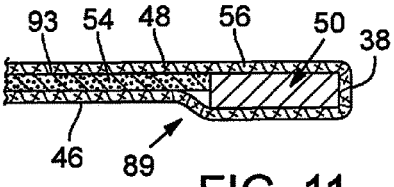
FIG. 11 is a section view of the forward area and forward edge of the bill of the headwear according to additional embodiments of the present disclosure.

In additional embodiments shown in FIG. 11, the stiffener 50 can be slightly thicker than the insert 54. In the illustrated embodiments of FIG. 11, the upper surface 56 of the stiffener 50 can be substantially aligned with the upper surface 93 of the insert 54. As such, the lower surface of the bill 16 can include a slight ridge 89 where the stiffener 50 and insert 54 meet.

The bill 16 can also include one or more rows of stitching 91 (FIGS. 1-3) that can firmly attach the covering layer 48, to the insert 54 and the covering layer 48 to the stiffener 16. The rows of stitching 91 can run along the outer edge 38 of the bill 16, from the lateral area 41a, across the forward area 40, to the lateral area 41b. In the embodiments shown, a first (forward) edge 90 of the insert 54 can butt up against the rear edge 62 of the stiffener 50, and this abutting junction can be disposed between adjacent (neighboring) rows of stitching 91.

Figure 12:
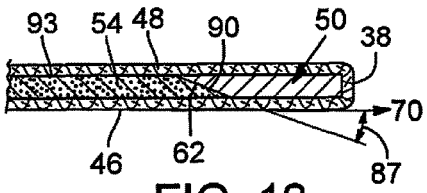
FIG. 12 is a section view of the forward area and forward edge of the bill of the headwear according to additional embodiments of the present disclosure.

Moreover, in the cross section of FIG. 3, the first edge 90 of the insert 54 and the rear edge 62 of the stiffener 50 are substantially perpendicular to the forward direction 70. However, in additional embodiments shown in FIG. 12, the edges 90, 62 can be disposed at an acute angle 87 relative to the forward direction 70. Also, in the embodiments of FIG. 12, the thickness of the insert 54 and stiffener 50 are substantially equal, similar to the embodiments of FIG. 3.

It will be appreciated that the insert 54 can be relatively lightweight and can, thus, reduce the weight of the hat 12. In additional embodiments, the insert 54 may not be included in the bill 16, and the cavity 52 can remain substantially open and unfilled, thereby reducing weight of the hat 12 even further. Also, it will be appreciated that the insert 54 and/or the space within the cavity 52 can allow the inner edge 36 to conform comfortably to the wearer's forehead. Moreover, the stiffener 50 can be sufficiently spaced from the forehead such that the stiffener 50 is unlikely to butt into the forehead and cause discomfort.

The stiffener 50, on the other hand, can increase the stiffness of the bill 16 such that the bill 16 holds its shape. Also, the stiffener 50 can be bent, folded, or otherwise deformed, and the stiffener 50 can resiliently recover, for instance, to the curved shape shown in FIG. 1 (e.g., the neutral position of the bill 16).

Moreover, the crown 14 and bill 16 can readily absorb and wick perspiration from the wearer. This can be due to the materials and the construction of the crown 14 and/or bill 16. Sweat from the crown 14 can readily move and into the bill 16 to be evaporated away. The perspiration can move across and distribute through the bill 16 substantially evenly to thereby enhance evaporation.

In some embodiments, the wearer's perspiration can flow in the forward direction 70 from the absorbing panel 34 and/or other portions of the crown 14 and into the covering layer 48 of the bill 16. This perspiration can flow across the insert 54 and stiffener 50. The perspiration in the forward area 40 can flow toward the lateral areas 41a, 41b due to the materials and/or curvature of the bill 14. Accordingly, perspiration is unlikely to pool and/or drip from the forward area 40 of the bill 16 and obscure the wearer's view.

In summary, the hat 12 can be well suited for jogging, working out, or other activities. This is because the hat 12 can be relatively lightweight, can cover the wearer's head, and can shade the wearer's eyes. Also, the perspiration absorbing panel 34 and other portions of the crown 14 can readily absorb and wick perspiration away from the wearer's head for cooling purposes. Moreover, the bill 16 can direct perspiration in a predetermined manner to keep the wearer's vision clear and unobscured.

Figure 8:
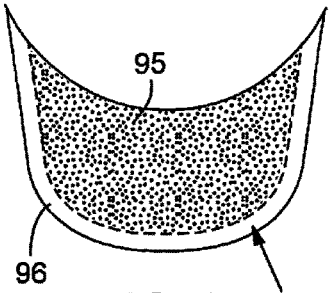
FIG. 8 is a plan view of a stiffener according to additional embodiments of the present disclosure.
Figure 9:
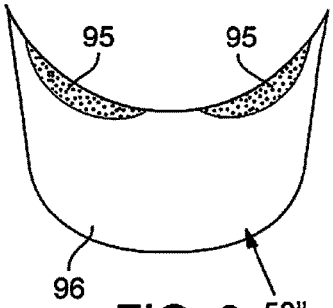
FIG. 9 is a plan view of a stiffener according to additional embodiments of the present disclosure.
Figure 10:
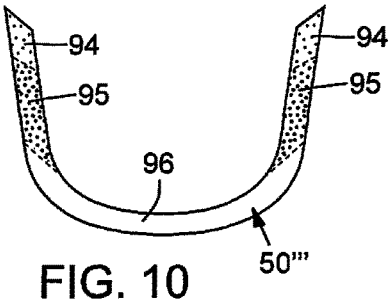
FIG. 10 is a plan view of a stiffener according to additional embodiments of the present disclosure.

Additional embodiments of the stiffener 50', 50", 50'" are shown in FIGS. 8-10. The stiffeners 50', 50", 50'" can be incorporated in the embodiments of the hat 12 discussed above.

As shown, the stiffener 50', 50", 50'" can be made from a molded, monolithic board having a plurality of zones of differing density, durometer, etc. The zones can resist resilient compression differently in some embodiments due to their differences in durometer, stiffness, density, etc.

For instance, as shown in FIG. 8, the stiffener 50' can have a first zone 96 and at least one other second zone 95 with a lower density than the first zone 96. The first zone 96 can be shaped similar to the stiffener 50 of FIG. 4, and the second zone 95 can be shaped similar to the insert 54 described above in relation to the embodiments of FIGS. 1-3. Also, the first and second zones 96, 95 can have substantially equal thicknesses so as to define the upper and lower surfaces of the stiffener 50'. The zones 96, 95 can be disposed on the stiffener 50' to improve the fit of the headwear on the wearer's head, according to weight saving characteristics of the stiffener 50', according to aerodynamic advantages, to make the bill 16 foldable, etc.

The stiffener 50" shown in FIG. 9 is an example that includes a larger first zone 96 and plural (e.g., two) second zones 95. These zones 95 can be less dense than the first zone 96, and the zones 95 can be disposed adjacent the wearer's temples for increased comfort. Additionally, the stiffener 50'" of FIG. 10 can include one or more first zones 96 of higher density, one or more second zones 95 of lower density than the zone(s) 96, and one or more third zone(s) 94 of a density between that of the first and second zones 96, 95. The stiffener 50'" can be shaped similar to the stiffener 50 of FIG. 4. Also, the first zone 96 can be disposed in front of the two second zones 95, and the second zones 95 can be disposed in front of the two third zones 94 in the embodiments of FIG. 10.

It will be appreciated that the different zones 94, 95, 96 can be shaped in any suitable fashion. Also, the zones 94, 95, 96 can be disposed in any suitable location on the stiffener 50', 50", 50'".

The stiffeners 50', 50", 50'" can be molded in some embodiments. As such, the zones 94, 95, 96 can be integrally attached such that the stiffeners 50', 50", 50'" are each monolithic. Also, the stiffeners 50', 50", 50'" can be made from foam material in some embodiments.

In summary, the articles of headwear 10 discussed herein can be lightweight, comfortable, and aesthetically pleasing. The headwear 10 can also actively absorb and wick perspiration away from the wearer's head and promote evaporation of the perspiration. Thus, the headwear 10 can be well suited for jogging and other physically challenging activities.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An article of headwear configured to be worn on a head of a wearer comprising:

a crown that is configured for covering a portion of the head; and a bill that defines an inner edge that is operably coupled to the crown, the bill also projecting away from the crown and terminating at an outer edge, the bill including a stiffener that extends along and that stiffens the outer edge, the stiffener being spaced from the crown to define a cavity between the stiffener and the crown, the stiffener having a first longitudinal end that is adjacent the inner edge, a second longitudinal end that is adjacent the inner edge, an intermediate portion that is disposed between the first longitudinal end and the second longitudinal end, a top side, and a bottom side, a cross section of the stiffener being substantially constant in the intermediate portion between the first and second longitudinal ends, and at least one of the top and bottom sides being substantially flat in the cross section of the stiffener, wherein the stiffener is monolithic, and wherein the stiffener includes a first zone and a second zone, the first zone and the second zone being resilient and compressible, the first zone having a first resistance to resilient compression, the second zone having a second resistance to resilient compression that is different from the first zone.

2. The article of headwear of claim 1, wherein both of the top and bottom sides are substantially flat in the cross section of the stiffener.

3. The article of headwear of claim 1, wherein the at least one of the first longitudinal end and the second longitudinal end tapers in a direction moving away from the intermediate portion.

4. The article of headwear of claim 1, wherein the outer edge defines a forward area, a first lateral area, and a second lateral area, and wherein the bill is configured to receive perspiration from the crown and direct the perspiration generally away from the forward area and toward the first lateral area and toward the second lateral area.

5. The article of headwear of claim 1, wherein the bill includes a covering layer that encloses the stiffener within the bill, the cavity defined between the covering layer, the stiffener, and the crown.

6. An article of headwear configured to be worn on a head of a wearer comprising:

a crown that is configured for covering a portion of the head;

a bill that defines an inner edge that is operably coupled to the crown, the bill also projecting away from the crown and terminating at an outer edge, the bill including a *U-shaped* stiffener that extends along and that stiffens the outer edge, [the stiffener being spaced from the crown to define a cavity between the stiffener and the crown,] the *U-shaped* stiffener having a first longitudinal end that is adjacent the inner edge, a second longitudinal end that is adjacent the inner edge, an intermediate portion that is disposed between the first longitudinal end and the second longitudinal end *and that is spaced apart from the crown*, a top side, and a bottom side, a cross section of the *U-shaped* stiffener being substantially constant in the intermediate portion between the first and second longitudinal ends, and at least one of the top and bottom sides being substantially flat in the cross section of the *U-shaped* stiffener, wherein the bill includes a covering layer that encloses the *U-shaped* stiffener within the bill[, the cavity defined between the covering layer, the stiffener, and the crown];

*a cavity between the covering layer and the crown;* and an insert [that is received and enclosed] within the cavity.

7. The article of headwear of claim 6, wherein the insert is resiliently flexible.

8. The article of headwear of claim 6, wherein the insert includes an upper surface, the upper surface and the top surface of the *U-shaped* stiffener being substantially aligned in a cross section of the bill.

9. The article of headwear of claim 6, wherein the insert has a thickness that is substantially equal to a thickness of the *U-shaped* stiffener.

10. The article of headwear of claim 6, wherein the insert includes a first edge that is adjacent a rear edge of the *U-shaped* stiffener, the crown further including a plurality of rows of stitches, the first edge of the insert and the rear edge of the *U-shaped* stiffener being disposed between neighboring ones of the rows of stitches.

11. The article of headwear of claim 6, wherein the *U-shaped* stiffener has a greater thickness than the insert.

12. The article of headwear of claim 6, wherein the bill defines a forward direction, wherein the insert includes a second edge that is adjacent a rear edge of the *U-shaped* stiffener, and wherein the second edge and the rear edge of the *U-shaped* stiffener are disposed at an acute angle relative to the forward direction.

13. The article of headwear of claim 1, wherein the crown includes a plurality of panels that are attached along at least one seam, and further comprising a tape that is attached to the crown to cover the at least one seam on an interior surface of the crown.

14. The article of headwear of claim 13, wherein the tape is adhesively attached to the crown.

15. The article of headwear of claim 1, wherein the crown and the bill cooperate to define a baseball hat.

16. The article of headwear of claim 1, further comprising a perspiration absorbing panel that defines *a* forehead covering portion of the crown.

17. The article of headwear of claim 1, the first zone and the second zone having at least one of a different durometer, and a different density.

18. An article of headwear configured to be worn on a head of a wearer comprising:

a crown that is configured for covering a portion of the head; and a bill that defines an inner edge that is operably coupled to the crown, the bill also projecting away from the crown and terminating at an outer edge, the bill including:

a *U-shaped* stiffener that extends along and that stiffens the outer edge, *an intermediate portion of* the *U-shaped* stiffener being spaced from the crown, the *U-shaped* stiffener including a top surface, a covering layer that encloses the *U-shaped* stiffener within the bill, a cavity defined between the covering layer, the *U-shaped* stiffener, and the crown, and an insert that is received and enclosed within the cavity, the insert including an upper surface, the upper surface and the top surface of the *U-shaped* stiffener being substantially aligned in a cross section of the bill.

19. The article of headwear of claim 18, wherein the *U-shaped* stiffener also includes a bottom surface, and wherein the top surface and the bottom surface are substantially flat in a cross section of the *U-shaped* stiffener.

20. The article of headwear of claim 19, wherein the *U-shaped* stiffener has a first longitudinal end that is adjacent the inner edge, *and* a second longitudinal end that is adjacent the inner edge, [and an] *wherein the* intermediate portion [that] *of the U-shaped stiffener* is disposed between the first longitudinal end and the second longitudinal end, the cross section of the *U-shaped* stiffener being substantially constant in the intermediate portion between the first and second longitudinal ends.

21. The article of headwear of claim 20, wherein the at least one of the first longitudinal end and the second longitudinal end tapers in a direction moving away from the intermediate portion.

22. The article of headwear of claim 18, wherein the outer edge defines a forward area, a first lateral area, and a second lateral area, and wherein the bill is configured to receive perspiration from the crown and direct the perspiration generally away from the forward area and toward the first lateral area and toward the second lateral area.

23. The article of headwear of claim 18, wherein the insert is resiliently flexible.

24. The article of headwear of claim 18, wherein the insert includes a first edge that is adjacent the crown and a second edge that is adjacent a rear edge of the *U-shaped* stiffener, the crown further including a plurality of rows of stitches, the second edge of the insert and the rear edge of the *U-shaped* stiffener being disposed between neighboring ones of the rows of stitches.

25. The article of headwear of claim 18, wherein the crown includes a plurality of panels that are attached along at least one seam, and further comprising a tape that is attached to the crown to cover the at least one seam on an interior surface of the crown.

26. The article of headwear of claim 25, wherein the tape is adhesively attached to the crown.

27. The article of headwear of claim 18, wherein the crown and the bill cooperate to define a baseball hat.

28. The article of headwear of claim 18, further comprising a perspiration absorbing panel that defines a forehead covering portion of the crown.

29. An article of headwear configured to be worn on a head of a wearer comprising:

a crown that is configured for covering a portion of the head; and a bill that defines an inner edge that is operably coupled to the crown, the bill also projecting away from the crown and terminating at an outer edge, the bill including:

a *U-shaped* stiffener that extends along and that stiffens the outer edge, [the stiffener being spaced from the crown,] the *U-shaped* stiffener including a first longitudinal end that is adjacent the inner edge, a second longitudinal end that is adjacent the inner edge, an intermediate portion that is disposed between the first longitudinal end and the second longitudinal end *and that is spaced apart from the crown*, a top side, and a bottom side, a cross section of the *U-shaped* stiffener being substantially constant in the intermediate portion between the first and second longitudinal ends, both of the top and bottom sides being substantially flat in the cross section of the *U-shaped* stiffener, a covering layer with an upper outer surface and a lower outer surface, the covering layer enclosing the *U-shaped* stiffener within the bill, a cavity defined between the covering layer, the *U-shaped* stiffener, and the crown, and a resiliently compressible insert that is received and enclosed within the cavity, the insert having a thickness that is substantially equal to a thickness of the *U-shaped* stiffener, the insert including an upper surface, the upper surface and the top surface of the *U-shaped* stiffener being substantially aligned in a cross section of the bill, wherein the covering layer lies substantially smooth over the insert and the *U-shaped* stiffener.

* * * * *